United States Patent
Li et al.

(10) Patent No.: US 12,332,527 B2
(45) Date of Patent: Jun. 17, 2025

(54) PIXEL STRUCTURE AND DISPLAY PANEL

(71) Applicant: TCL CHINA STAR OPTOELECTRONICS TECHNOLOGY CO., LTD., Guangdong (CN)

(72) Inventors: Jie Li, Guangdong (CN); Jianjian Ying, Guangdong (CN); Yingying Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,000

(22) PCT Filed: Apr. 13, 2022

(86) PCT No.: PCT/CN2022/086577
§ 371 (c)(1),
(2) Date: Apr. 19, 2022

(87) PCT Pub. No.: WO2023/178749
PCT Pub. Date: Sep. 28, 2023

(65) Prior Publication Data
US 2024/0377688 A1 Nov. 14, 2024

(30) Foreign Application Priority Data
Mar. 22, 2022 (CN) .......................... 202210288863.8

(51) Int. Cl.
*G02F 1/1368* (2006.01)
*G02F 1/1362* (2006.01)

(52) U.S. Cl.
CPC ...... *G02F 1/1368* (2013.01); *G02F 1/136286* (2013.01)

(58) Field of Classification Search
CPC . G02F 1/1368; G02F 1/136286; G02F 1/1335
See application file for complete search history.

(56) References Cited

U.S. PATENT DOCUMENTS

2010/0314622 A1  12/2010  Kuo et al.
2022/0102382 A1*  3/2022  Lin .................. H01L 27/124
2022/0373845 A1* 11/2022  Zhang ............... G02F 1/136209

FOREIGN PATENT DOCUMENTS

CN      1847964 A   10/2006
CN    102231030 A   11/2011
(Continued)

OTHER PUBLICATIONS

International Search Report in International application No. PCT/CN2022/086577, mailed on Nov. 30, 2022.
(Continued)

*Primary Examiner* — Lucy P Chien
(74) *Attorney, Agent, or Firm* — PV IP PC; Wei Te Chung (57) ABSTRACT

The present application discloses a pixel structure and a display panel. A sub-pixel set of the pixel structure includes a first sub-pixel unit having a first thin film transistor and a second sub-pixel unit having a second thin film transistor, a first source electrode of the first thin film transistor and a second source electrode of the second thin film transistor is connected to the same data line. The pixel structure further includes and an extension electrode connected to the first drain electrode or the second drain electrode and located between the first pixel electrode and the second pixel electrode.

18 Claims, 5 Drawing Sheets

(56) References Cited

FOREIGN PATENT DOCUMENTS

| | | |
|---|---|---|
| CN | 103926765 A | 7/2014 |
| CN | 104155817 A | 11/2014 |
| CN | 104570530 A | 4/2015 |
| CN | 105278189 A | 1/2016 |
| CN | 106483728 A | 3/2017 |
| CN | 107608146 A | 1/2018 |
| CN | 111338142 A | 6/2020 |
| CN | 112147825 A | 12/2020 |
| CN | 113985671 A | 1/2022 |
| CN | 215526310 U | 1/2022 |

OTHER PUBLICATIONS

Written Opinion of the International Search Authority in International application No. PCT/CN2022/086577, mailed on Nov. 30, 2022.

Chinese Office Action issued in corresponding Chinese Patent Application No. 202210288863.8 dated Jun. 4, 2023, pp. 1-8.

* cited by examiner

PIXEL STRUCTURE AND DISPLAY PANEL

FIELD OF INVENTION

The present application relates to a field of display technologies, especially to a pixel structure and a display panel.

BACKGROUND OF INVENTION

Liquid crystal display (LCD) devices are most extensively applied display products in the current markets, and has sophisticated manufacturing processes, high yield rate, low cost, and high market acceptance.

In a conventional display panel of a data line sharing (DLS) large viewing angle pixel driving framework, the DLS framework lowers a cost of the display panel by reducing a number of source drivers (SDs). In a conventional display panel of the DLS framework, because adjacent two sub-pixels commonly use the same data line, and no data line is disposed between the adjacent two sub-pixels, it results in that capacitor between the sub-pixels and the data lines cannot be offset to cause roughness and crosstalk of images of the display panel are more serious than a common 1G1D framework to lead to abnormal display such as shaking head pattern.

Therefore, a pixel structure and a display panel are urgently required to solve the above issue.

SUMMARY OF INVENTION

Technical Issue

The present application provides a pixel structure and a display panel to solve a technical issue of poor images displayed by the display panel if a DLS framework.

Solution for Issues

Technical Solution

The present application provides a pixel structure, the pixel structure comprises a plurality of scan lines and a plurality of data lines intersecting each other, the scan lines and the data lines define a plurality of sub-pixel sets; wherein each of the sub-pixel sets comprises:
  a common electrode;
  a first sub-pixel unit, wherein the first sub-pixel unit comprises a first thin film transistor and a first pixel electrode, and a first drain electrode of the first thin film transistor is connected to the first pixel electrode; and
  a second sub-pixel unit, wherein the second sub-pixel unit comprises a second thin film transistor and a second pixel electrode, a second drain electrode of the second thin film transistor is connected to the second pixel electrode, a first source electrode of the first thin film transistor and a second source electrode of the second thin film transistor are connected to the same one of the data lines;
  wherein the pixel structure further comprises an extension electrode connected to the first drain electrode or the second drain electrode and located between the first pixel electrode and the second pixel electrode.

The present application also sets forth a display panel, the display panel comprises a thin film transistor (TFT) substrate, a color filter (CF) substrate disposed opposite to the TFT substrate, and a liquid crystal layer encapsulated between the TFT substrate and the CF substrate, the TFT substrate comprises a pixel structure, wherein the pixel structure comprises a plurality of scan lines and a plurality of data lines intersecting each other, the scan lines and the data lines define a plurality of sub-pixel sets, and each of the sub-pixel sets comprises:
  a common electrode;
  a first sub-pixel unit, wherein the first sub-pixel unit comprises a first thin film transistor and a first pixel electrode, and a first drain electrode of the first thin film transistor is connected to the first pixel electrode; and
  a second sub-pixel unit, wherein the second sub-pixel unit comprises a second thin film transistor and a second pixel electrode, a second drain electrode of the second thin film transistor is connected to the second pixel electrode, a first source electrode of the first thin film transistor and a second source electrode of the second thin film transistor are connected to the same one of the data lines;
  wherein the pixel structure further comprises an extension electrode connected to the first drain electrode or the second drain electrode and located between the first pixel electrode and the second pixel electrode.

Advantages of Invention

Advantages

The present application disposes an extension electrode between adjacent two sub-pixels units such that a storage capacitor is formed between the extension electrode and a common electrode, which increases a ratio of the storage capacitor in the sub-pixel unit, lowers a ratio of the capacitor formed by the pixel electrode and the data lines, and reduce influence to images displayed by the product.

DETAILED DESCRIPTION OF EMBODIMENTS

Detailed Description of the Embodiments

To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

Figure 1:
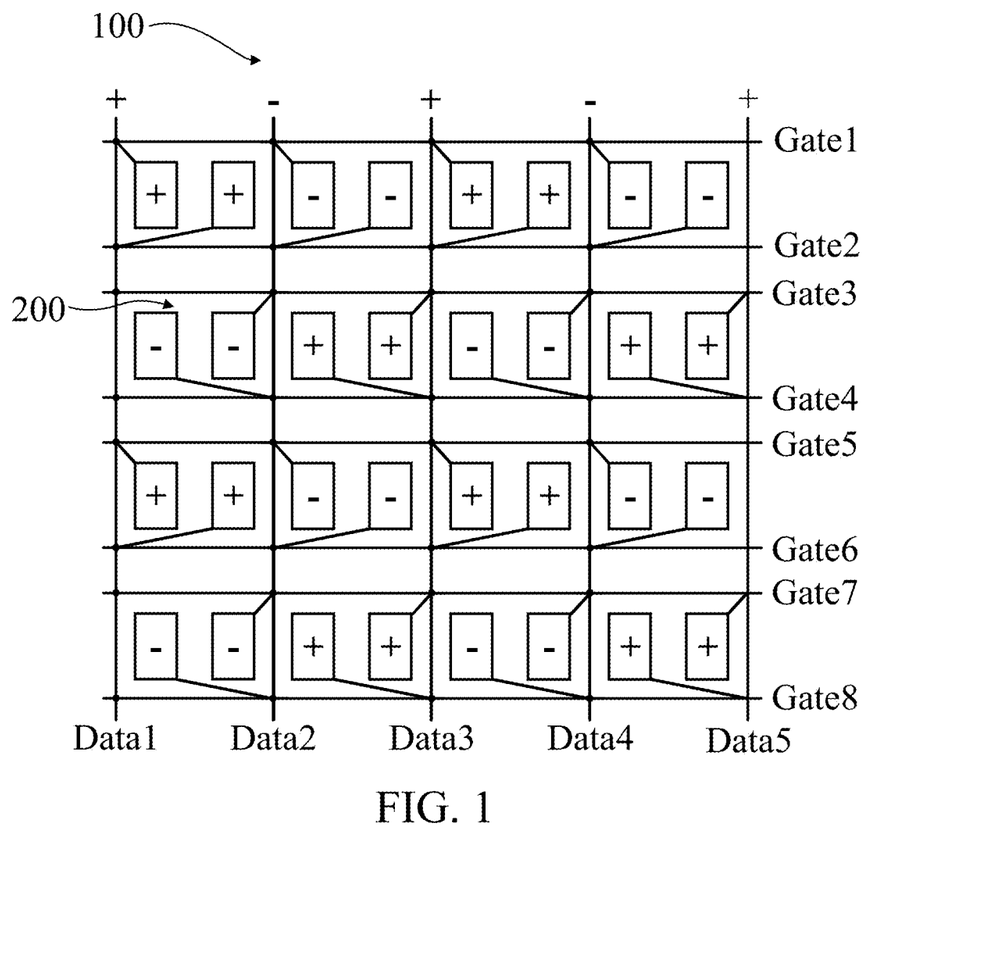
FIG. 1 is a top structural view of a DLS framework of a conventional pixel structure.

With reference to FIG. 1, adjacent two sub-pixels commonly using a data line results in a capacitor Cpd1 formed by a sub-pixel A and the data line Data1 and a capacitor Cpd2 formed by a sub-pixel B and the data line Data2. Because no data line is disposed between the adjacent two sub-pixels, the capacitors Cpd1 and Cpd2 cannot offset each other and result in that roughness and crosstalk of images of the display panel are more serious than a common 1G1D structure and abnormal display such as a shaking head pattern occurs. The present application sets forth a pixel structure to solve the above technical issue.

Figure 2:
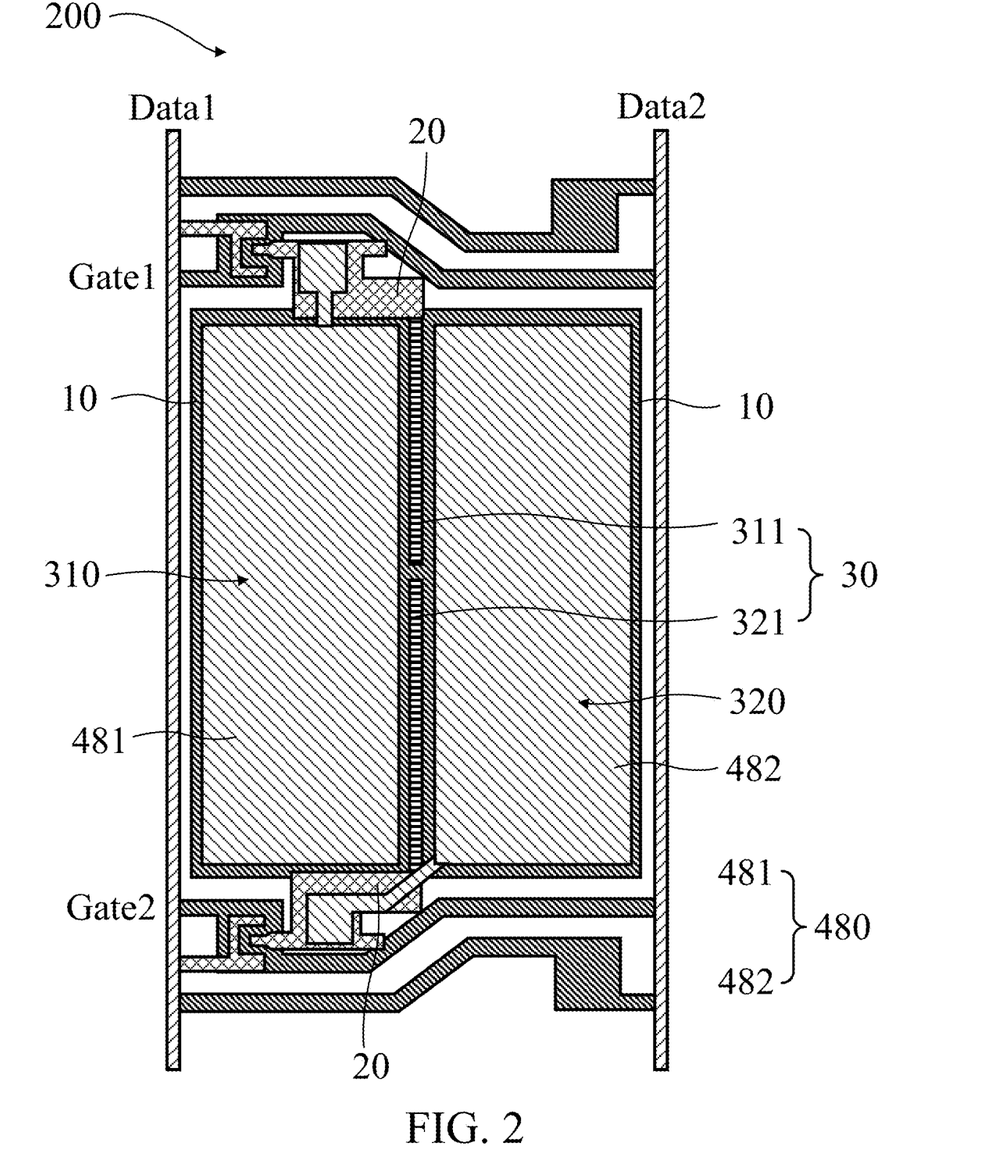
FIG. 2 is a first structural view of sub-pixel sets of a pixel structure of the present application.

With reference to FIG. 2, the present application provides a pixel structure 100, the pixel structure 100 comprises a plurality of the scan lines Gate and a plurality of the data lines Data intersecting each other. A plurality of scan lines Gate and a plurality of data lines Data define a plurality of sub-pixel sets 200. Each of the sub-pixel sets 200 comprises:

a common electrode 10;

a first sub-pixel unit 310, wherein the first sub-pixel unit 310 comprises a first thin film transistor and a first pixel electrode 481, wherein a first drain electrode of the first thin film transistor is connected to the first pixel electrode 481; and a second sub-pixel unit 320, wherein the second sub-pixel unit 320 comprises a second thin film transistor and a second pixel electrode 482, a second drain electrode of the second thin film transistor is connected to the second pixel electrode 482, a first source electrode of the first thin film transistor and a second source electrode of the second thin film transistor is connected to the same one of the data lines Data;

wherein the pixel structure 100 further comprises an extension electrode 30 connected to the first drain electrode or the second drain electrode and is located between the first pixel electrode 481 and the second pixel electrode 482.

In the present embodiment, because the capacitor Cpd formed between the pixel electrode and the data lines Data cannot be offset, a ratio of image roughness and crosstalk of the display panel increases, the present application disposes the extension electrode 30 between adjacent two sub-pixels units such that a storage capacitor is formed by the extension electrode 30 and the common electrode 10, which increases a ratio of the storage capacitor in a total capacitor amount in the sub-pixel unit, lowers a ratio of the capacitor Cpd in the total capacitor amount in the sub-pixel unit. The ratio of the capacitor Cpd reduces to further ease influence of the capacitor Cpd to images displayed by the product.

It should be explained that the extension electrode 30 and the storage electrode 20 do not overlap each other.

It should be explained that the pixel structure 100 can have some regions disposed with a DLS framework, and some other regions disposed with a non-DLS framework. Various frameworks can be disposed parallelly. The pixel structure 100 of the present embodiment uses the DLS framework as an example for explanation.

It should be explained that one sub-pixel set 200 can comprise two or more sub-pixel units, the present embodiment uses the sub-pixel sets 200 each having two sub-pixel units as an example for explanation.

Specific embodiments are combined for explanation of the technical solution of the present application as follows.

Figure 3:
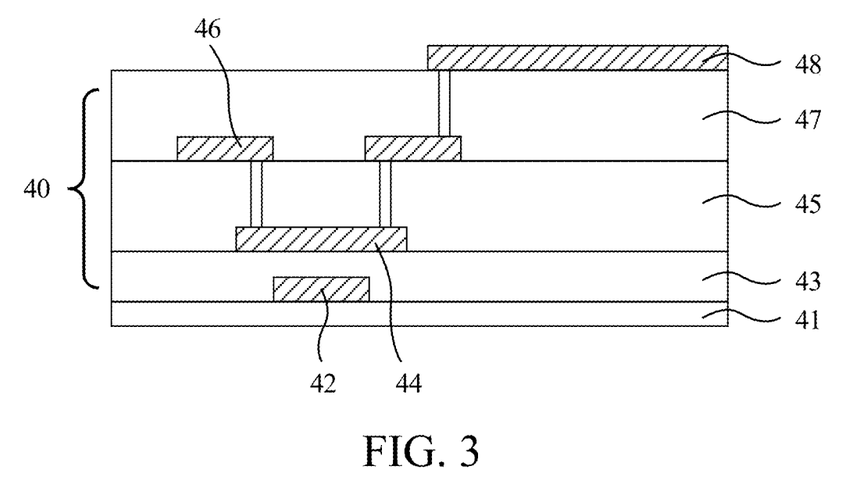
FIG. 3 is a cross-sectional view of the pixel structure of the present application.

With reference to FIG. 3, the pixel structure 100 can comprise an underlay 41 and a driver circuit layer 40 disposed on the underlay 41. The driver circuit layer 40 can comprise a plurality of thin film transistor, the thin film transistor can be etching barrier type, rear channel etching type, or according to positions of the gate electrode and the active layer, be classified as structures such as bottom gate thin film transistor, top gate thin film transistor, etc., there is no specific limit.

In the present embodiment, a material of the underlay 41 can be glass, quartz, polyimide, etc.

In the present embodiment, with reference to FIG. 1, a top gate thin film transistor is used as an example, the thin film transistor can comprise an active layer 42 disposed on the underlay 41, a gate insulation layer 43 disposed on the active layer 42, a gate electrode layer 44 disposed on the gate insulation layer 43, an interlayer insulation layer 45 disposed on the gate electrode layer 44, a source and drain electrode layer 46 disposed on the interlayer insulation layer 45, a passivation layer 47 disposed on the source and drain electrode layer 46, and a pixel electrode layer 48 disposed on the passivation layer 47.

In the present embodiment, the gate electrode layer 44 comprises a plurality of the scan lines Gate, the gate electrode and the common electrode 10.

In the present embodiment, the source and drain electrode layer 46 comprises a plurality of the data lines Data, a source electrode, a drain electrode and a storage electrode 20. The storage electrode 20 and the common electrode 10 form a storage capacitor corresponding to the sub-pixel unit.

In the present embodiment, pixel electrode layer 48 comprises a plurality of pixel electrodes 480 corresponding to the sub-pixel units. The pixel electrode 480 can have 4 domains or 8 domains, and the present application has no specific limit thereto. The following embodiment uses the pixel electrode 480 of 4 domains as an example for explanation.

In the present embodiment, with reference to FIG. 2, in one of the sub-pixel sets 200, the common electrodes 10 of adjacent two sub-pixels units are continuous and are electrically connected to each other. In each sub-pixel unit, the common electrode 10, the gate electrode, and the scan lines Gate are disposed in the same layer, namely, are formed by a metal material forming the gate electrode layer in the same process, to prevent a common voltage on the common electrode 10 from influencing a pixel voltage of the pixel electrode 48, a region of the common electrode 10 corresponding to the pixel electrode 480 is hollowed, and the pixel electrode 480 and the common electrode 10 partially overlap each other. Second, because no the data line Data is disposed in adjacent two sub-pixels units in the sub-pixel sets 200, namely, the common electrodes 10 in adjacent two sub-pixels units can be disposed continuously, which increases an area of the common electrode 10 and guarantees uniformity of the common voltage in the common electrode 10.

In the pixel structure 100 of the present application, with reference to FIG. 2, the first sub-pixel unit 310 is disposed near a corresponding one of the data lines Data, the second sub-pixel unit 320 is disposed away from a corresponding one of the data lines Data.

In the present embodiment, the extension electrode 30 comprises a first longitudinal electrode section 311 and a second longitudinal electrode section 321 disposed between the first sub-pixel unit 310 and the second sub-pixel unit 320. The first longitudinal electrode section 311 corresponds to the first sub-pixel unit 310, the second longitudinal electrode section 321 corresponds to the second sub-pixel unit 320, and the first longitudinal electrode section 311 and the second longitudinal electrode section 321 are disposed separately.

In the present embodiment, the data line Data1, the data line Data2, and the scan line Gate1, and the scan line Gate2 surround the sub-pixel set 200. The first sub-pixel unit 310 and the second sub-pixel unit 320 are disposed in the sub-pixel set 200. The first sub-pixel unit 310 and the second sub-pixel unit 320 are connected to the data lines Data1. In the first sub-pixel unit 310 and the second sub-pixel unit 320, passivation layer contact holes are disposed in two sides of the first sub-pixel unit 310. The pixel electrode 480 in the second sub-pixel unit 320 extends toward a region between the scan lines Gate2 and the first sub-pixel unit 310, and is connected to a corresponding one of the passivation layer contact holes.

In the present embodiment, a first longitudinal capacitor is formed between the first longitudinal electrode section 311 and the common electrode 10, and a second longitudinal capacitor is formed between the second longitudinal electrode section 321 and the common electrode 10. The first longitudinal capacitor is a newly added storage capacitor of the first sub-pixel unit 310, and the second longitudinal capacitor is a newly added storage capacitor of the second sub-pixel unit 320. Disposing the first longitudinal electrode section 311 and the second longitudinal electrode section 321 increases a ratio of the storage capacitor in sub-pixel unit, which lowers a ratio of the capacitor Cpd formed by the sub-pixel unit and the corresponding data line Data in a total capacitor amount in the sub-pixel unit to further ease influence of the capacitor Cpd to images displayed by the product, and improve the display quality of the product.

The first sub-pixel unit 310 in FIG. 2 is used as an example, under a condition of a capacitor Cgs and the capacitor Cpd having no variation, variation of the storage capacitor before and after improvement are as follows:

Before improvement, the capacitor Cgs is 15.324, the capacitor Cpd is 0.552, Cst is 160.599, Ctotal is 478.554, Vft is 1.15277, the capacitor Cgs/Ctotal is 3.20%, and the capacitor Cpd/Ctotal is 0.1153%;

After improvement, the capacitor Cgs is 15.324, the capacitor Cpd is 0.552, Cst is 230.165, the capacitor Ctotal is 561.779, Vft is 0.98199, the capacitor Cgs/Ctotal is 2.73%, and the capacitor Cpd/Ctotal is 0.09826%.

Compared to the conventional technology, the storage capacitor Cst of the present application increases by 43.316%, Vft reduces by 14.81%, the capacitor Cgs/Ctotal reduces by 14.687%, and the capacitor Cpd/Ctotal reduces by 14.779%, and a ratio of the capacitor Cpd in the total capacitor amount in the sub-pixel unit reduces, which eases influence of the capacitor Cpd to images displayed by the product and improves the display quality of the product.

In the present embodiment, along an extension direction of the data lines Data, a length size of the first longitudinal electrode section 311 can be equal to a length size of the second longitudinal electrode section 321. Sizes of longitudinal electrode sections in different ones of the sub-pixel units can be equal, namely, in different ones of the sub-pixel units, capacitor amounts of newly added storage capacitors are equal, which guarantees uniformity of images of the sub-pixel units in the display panel.

In the current the pixel structure 100, besides existence of storage capacitors and some parasitic capacitors, sudden voltages formed by the pixel feed voltage also exist. Namely, when the scan signal voltage changes from a high level of switching on TFT to a low level switching off, sudden change of the pixel level occurs due to coupling of the parasitic capacitor.

In the present embodiment, the first sub-pixel unit 310 and the second sub-pixel unit 320 are connected to the data line Data1, the second sub-pixel unit 320 is disposed away from the data line Data1, and the first sub-pixel unit 310 is disposed near the data line Data1. Therefore, a pixel feed voltage of the second sub-pixel unit 320 is greater than a pixel feed voltage of the first sub-pixel unit 310, which easily generates abnormal display such as a shaking head pattern.

In the pixel structure 100 of the present application, along an extension direction of the data lines Data, a length size of the first longitudinal electrode section 311 can be less than a length size of the second longitudinal electrode section 321.

The present application differentiates the length size of the first longitudinal electrode section 311 and the length size of the second longitudinal electrode section 321 such that the length size of the first longitudinal electrode section 311 is less than the length size of the second longitudinal electrode section 321. Namely, a capacitor increase amount of the storage capacitor in the second sub-pixel unit 320 is greater than a capacitor increase amount of the storage capacitor in the second sub-pixel unit 320. The increase of the capacitor amount of the storage capacitor in the second sub-pixel unit 320 balances a difference between pixel feed voltages of the first sub-pixel unit 310 and the second sub-pixel unit 320 and mitigates the technical issue of abnormal displayed images.

In the pixel structure 100 of the present application, along an extension direction of the scan lines Gate, a width size of the first longitudinal electrode section 311 is less than a width size of the second longitudinal electrode section 321.

Similar to the above embodiment, a capacitor amount of the capacitor is in proportion to an area of an electrode plate disposed oppositely. The present application increases the width sizes of the first longitudinal electrode section 311 and the second longitudinal electrode section 321 to further increase comparative areas of the first longitudinal electrode section 311 and the second longitudinal electrode section 321 relative to the common electrode 10 to improve the first longitudinal capacitor and the second longitudinal capacitor. The width size of the first longitudinal electrode section 311 is less than the width size of the second longitudinal electrode section 321, then the capacitor increase amount of the first longitudinal capacitor is less than the capacitor increase amount of the second longitudinal capacitor. The increase of the capacitor amount of the storage capacitor in the second sub-pixel unit 320 balances a difference between pixel feed voltages of the first sub-pixel unit 310 and the second sub-pixel unit 320 and mitigates the technical issue of abnormal displayed images.

Figure 4:
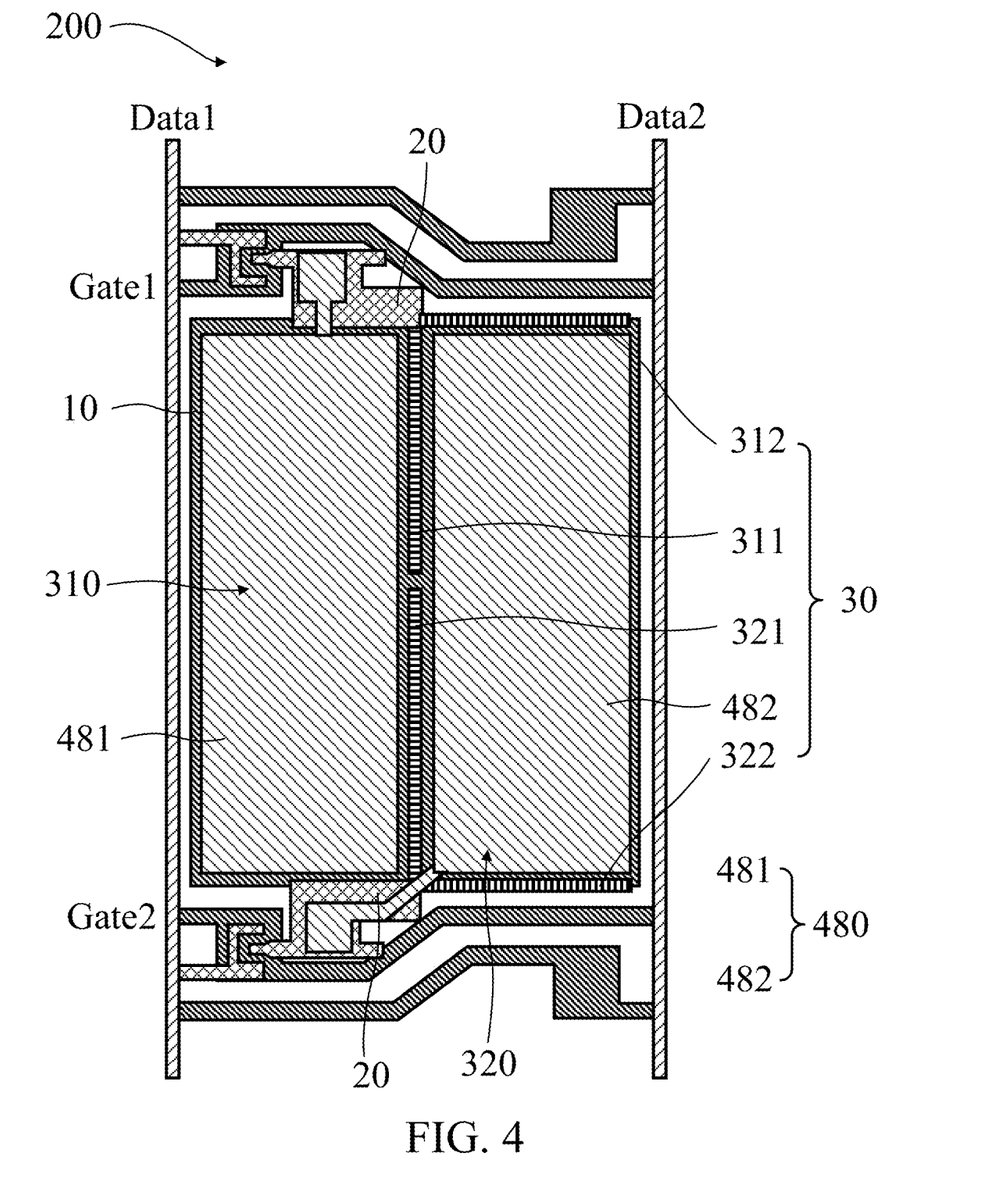
FIG. 4 is a second structural view of sub-pixel sets of the pixel structure of the present application.

In the pixel structure 100 of the present application, with reference to FIG. 4, the extension electrode 30 further comprises a first transverse electrode section 312 and a second transverse electrode section 322. The first transverse electrode section 312 and the second transverse electrode section 322 extend along a direction of the scan lines Gate. The first transverse electrode section 312 and the second transverse electrode section 322 are disposed on two sides of the second sub-pixel unit 320, namely, the first transverse electrode section 312 can be disposed between the second sub-pixel unit 320 and the scan lines Gate1, and the second transverse electrode section 322 can be disposed between the second sub-pixel unit 320 and the scan lines Gate2.

In the present embodiment, the first longitudinal electrode section 311 is electrically connected to the first transverse electrode section 312, and the second longitudinal electrode section 321 is electrically connected to the second transverse electrode section 322.

In the present embodiment, along a top view direction of the pixel structure 100, a periphery area of the common electrode 10 is greater than a periphery area of the pixel electrode 480, and the first transverse electrode section 312 and the second transverse electrode section 322 are disposed on two sides of the second sub-pixel unit 320. Namely, the first transverse electrode section 312 and the common electrode 10 form a first transverse capacitor, the second transverse electrode section 322 and the common electrode 10 form a second transverse capacitor, the first transverse capacitor is a newly added storage capacitor of the first sub-pixel unit 310, the second transverse capacitor is a newly added storage capacitor of the second sub-pixel unit 320. The storage capacitor commonly formed by the first transverse electrode section 312 and the first longitudinal electrode section 311 increases a ratio of the storage capacitor in the first sub-pixel unit 310. The storage capacitor commonly formed by the second transverse electrode section 322 and the second longitudinal electrode section 321 increases a ratio of the storage capacitor in the second sub-pixel unit 320, which lowers a ratio of the capacitor Cpd formed by the sub-pixel unit and the corresponding data line Data in a total capacitor amount in sub-pixel unit to further ease influence of the capacitor Cpd to images displayed by the product and improve the display quality of the product.

In the pixel structure 100 of the present application, a sum of lengths of the first longitudinal electrode section 311 and the first transverse electrode section 312 is less than a sum of lengths of the second longitudinal electrode section 321 and the second transverse electrode section 322.

In the present embodiment, the first transverse electrode section 312 and the first longitudinal electrode section 311 and the common electrode 10 form the corresponding first transverse capacitor and the corresponding first longitudinal capacitor. A sum of lengths of the first transverse electrode section 312 and the first longitudinal electrode section 311 is in proportion to a capacitor amount of a newly added storage capacitor of the first sub-pixel unit 310, the second transverse electrode section 322 and the second longitudinal electrode section 321 and the common electrode 10 form the corresponding second transverse capacitor and the corresponding second longitudinal capacitor. A sum of lengths of the second transverse electrode section 322 and the second longitudinal electrode section 321 is in proportion to a capacitor amount of a newly added storage capacitor of the second sub-pixel pixel unit 320.

In the present embodiment, based on a difference between pixel feed voltages of the first sub-pixel unit 310 and the second sub-pixel unit 320, the sum of the lengths of the first longitudinal electrode section 311 and the first transverse electrode section 312 can be less than the sum of the lengths of the second longitudinal electrode section 321 and the second transverse electrode section 322 such that an increasing capacitor amount of the storage capacitor of that the second sub-pixel unit 320 is greater than an increasing capacitor amount of the storage capacitor of the second sub-pixel unit 320, which balances the difference between the pixel feed voltages of the first sub-pixel unit 310 and the second sub-pixel unit 320, mitigates the technical issue of abnormal images.

Figure 5:
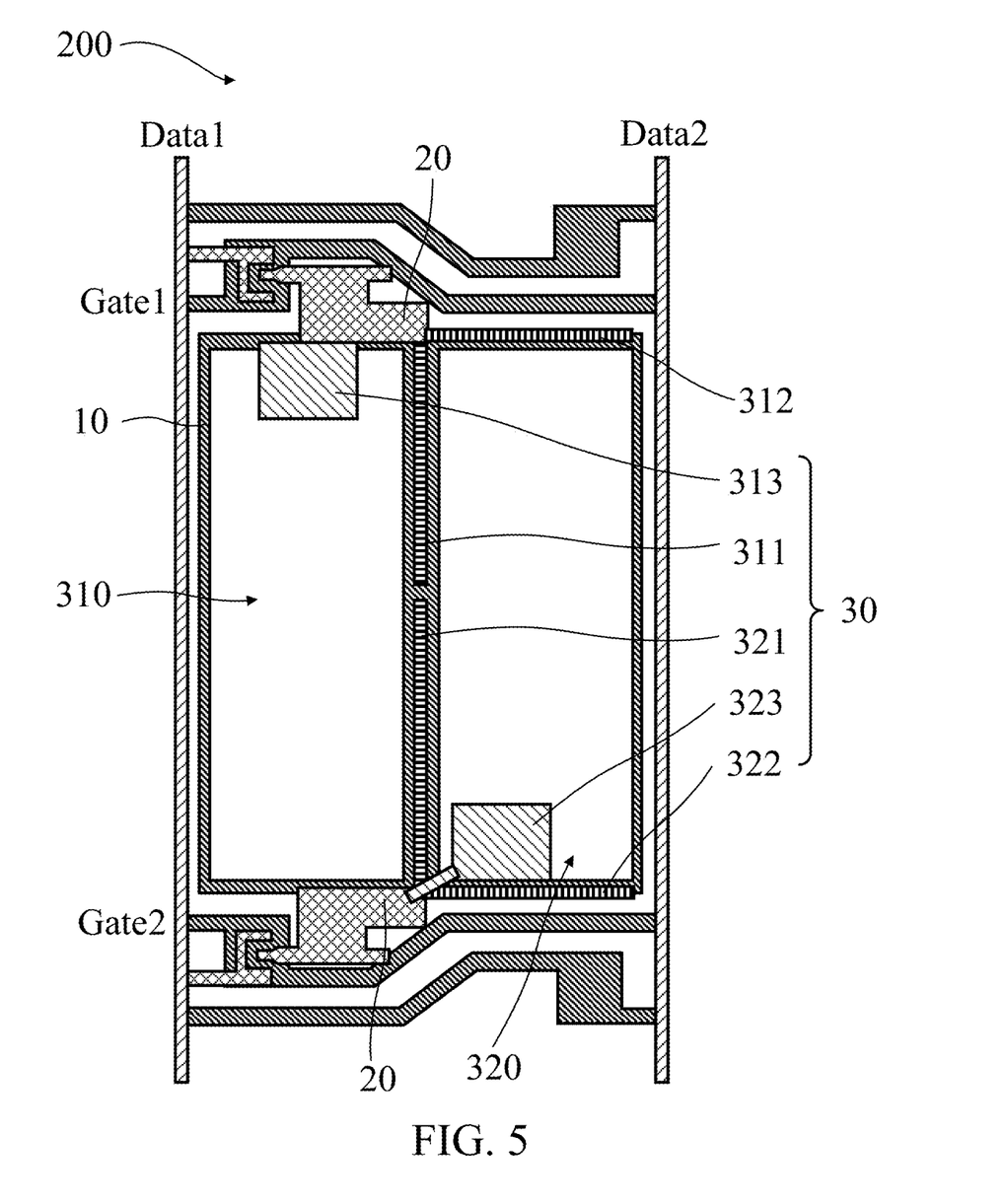
FIG. 5 is a third structural view of the sub-pixel sets of the pixel structure of the present application.

In the pixel structure 100 of the present application, with reference to FIG. 5, the extension electrode 30 further comprises a first transparent electrode 313 and a second transparent electrode 323, the first longitudinal electrode section 311 is electrically connected to the first transparent electrode 313, and the second longitudinal electrode section 321 is electrically connected to the second transparent electrode 323.

In the present embodiment, for convenience of descriptions of solutions, the pixel electrode 480 in FIG. is removed, the first transparent electrode 313 and the second transparent electrode 323 are located pixel electrode regions of corresponding ones of the sub-pixel units respectively.

In the present embodiment, along a top view direction of the pixel structure 100, the first transparent electrode 313 is located in the first sub-pixel unit 310, and the second transparent electrode 323 is located in the second sub-pixel unit 320.

In the present embodiment, because a region of the common electrode 10 corresponding to the pixel electrode 480 is hollowed, the transparent common electrode 10 can be paved in the common electrode 10, namely, the capacitor formed by the transparent common electrode 10 in the first transparent electrode 313 and the first sub-pixel unit 310 is a newly added storage capacitor of the first sub-pixel unit 310, a capacitor formed by the transparent common electrode 10 in the second transparent electrode 323 and the second sub-pixel unit 320 is a newly added storage capacitor of the second sub-pixel unit 320. Disposing the first transparent electrode 313 and the second transparent electrode 323 increases a ratio of storage capacitor in a corresponding sub-pixel unit, which lowers a ratio of the capacitor Cpd formed by the sub-pixel unit and the corresponding data line Data in a total capacitor amount in the sub-pixel unit to further ease influence of the capacitor Cpd to images displayed by the product, and improve the display quality of the product.

In the present embodiment, because the common electrode 10 and the pixel electrode 480 partially overlap each other, the first transparent electrode 313 and the second transparent electrode 323 can also form a new storage capacitor with the common electrode 10.

In the present embodiment, a material of the first transparent electrode 313 and the second transparent electrode 323, and the transparent common electrode 10 can be the same as a material of the pixel electrode 480.

In the present embodiment, an area of the first transparent electrode 313 can be less than an area of the second transparent electrode 323 to balance a difference between pixel feed voltages of the first sub-pixel unit 310 and the second sub-pixel unit 320.

In the pixel structure 100 of the present application, the first longitudinal electrode section 311, the second longitudinal electrode section 321, the first transparent electrode 313, the second transparent electrode 323, the first transverse electrode section 312, and the second transverse electrode section 322 can be disposed in the same layer.

The storage electrode 20 of the present application is formed by a material of the source and drain electrode layer 46. Therefore, for simplifying processes, the first longitudinal electrode section 311, the second longitudinal electrode section 321, the first transverse electrode section 312, and the second transverse electrode section 322 can be formed by the material of the source and drain electrode layer 46, the first transparent electrode 313, and the second transparent electrode 323 can be formed by a transparent conductive material in the same layer with the source and drain electrode layer 46.

In the present embodiment, the present application can have no specific limit to setting of positions of the transverse electrode section, the longitudinal electrode section, and the transparent electrode, as long as they are located on two sides of the common electrode 10 and would shield the light transmittance of a region in which the pixel electrode 480 is located.

The present application also sets forth a display panel, the display panel comprises a thin film transistor (TFT) substrate, a color filter (CF) substrate opposite to the TFT substrate, and a liquid crystal layer encapsulated between the TFT substrate and the CF substrate. The TFT substrate comprises the above the pixel structure 100.

The present application also sets forth a display device, the display device comprises the above display panel and a light emitting member located on a side of the display panel. The display panel and the light emitting member can be assembled as a whole, for example, the light emitting member can be a backlight module. The display device of the present embodiment comprises an electronic apparatus such as a cell phone, television, or a notebook.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A pixel structure, wherein the pixel structure comprises a plurality of scan lines and a plurality of data lines intersecting each other, the scan lines and the data lines define a plurality of sub-pixel sets; wherein each of the sub-pixel sets comprises:
   a common electrode;
   a first sub-pixel unit, wherein the first sub-pixel unit comprises a first thin film transistor and a first pixel electrode, and a first drain electrode of the first thin film transistor is connected to the first pixel electrode; and
   a second sub-pixel unit, wherein the second sub-pixel unit comprises a second thin film transistor and a second pixel electrode, a second drain electrode of the second thin film transistor is connected to the second pixel electrode, a first source electrode of the first thin film transistor and a second source electrode of the second thin film transistor are connected to the same one of the data lines;
   wherein the pixel structure further comprises an extension electrode connected to the first drain electrode or the second drain electrode and located between the first pixel electrode and the second pixel electrode;
   wherein the first sub-pixel unit is disposed near a corresponding one of the data lines, the second sub-pixel unit is disposed away from a corresponding one of the data lines; and
   wherein the extension electrode comprises a first longitudinal electrode section and a second longitudinal electrode section disposed in a longitudinal gap formed between the first sub-pixel unit and the second sub-pixel unit, the first longitudinal electrode section corresponds to the first sub-pixel unit, the second longitudinal electrode section corresponds to the second sub-pixel unit, and the first longitudinal electrode section and the second longitudinal electrode section are disposed separately.

2. The pixel structure according to claim 1, wherein along an extension direction of the data lines, a length size of the first longitudinal electrode section is less than a length size of the second longitudinal electrode section.

3. The pixel structure according to claim 1, wherein along an extension direction of the scan lines, a width size of the first longitudinal electrode section is less than a width size of the second longitudinal electrode section.

4. The pixel structure according to claim 1, wherein the extension electrode further comprises first transverse electrode section and second transverse electrode section, the first transverse electrode section and the second transverse electrode section extends along a direction of the scan lines, the first transverse electrode section and the second transverse electrode section are disposed on two sides of the second sub-pixel unit.

5. The pixel structure according to claim 4, wherein the first longitudinal electrode section is electrically connected to the first transverse electrode section, and the second longitudinal electrode section is electrically connected to the second transverse electrode section.

6. The pixel structure according to claim 5, wherein a sum of lengths of the first longitudinal electrode section and the first transverse electrode section is less than a sum of lengths of the second longitudinal electrode section and the second transverse electrode section.

7. The pixel structure according to claim 5, wherein the extension electrode further comprises a first transparent electrode and a second transparent electrode, the first longitudinal electrode section is electrically connected to the first transparent electrode, and the second longitudinal electrode section is electrically connected to the second transparent electrode.

8. The pixel structure according to claim 7, wherein along a top view direction of the pixel structure, the first transparent electrode is located in the first sub-pixel unit, the second transparent electrode is located in the second sub-pixel unit.

9. The pixel structure according to claim 8, wherein the first longitudinal electrode section, the second longitudinal electrode section, the first transparent electrode, the second transparent electrode, the first transverse electrode section, and the second transverse electrode section are disposed in the same layer.

10. The pixel structure according to claim 1, wherein in each of the sub-pixel sets, the common electrodes in adjacent two of sub-pixel units are continuous and electrically connected to each other.

11. A display panel, wherein the display panel comprises a thin film transistor (TFT) substrate, a color filter (CF) substrate disposed opposite to the TFT substrate, and a liquid crystal layer encapsulated between the TFT substrate and the CF substrate, the TFT substrate comprises a pixel structure, wherein the pixel structure comprises a plurality of scan lines and a plurality of data lines intersecting each other, the scan lines and the data lines define a plurality of sub-pixel sets, and each of the sub-pixel sets comprises:
   a common electrode;
   a first sub-pixel unit, wherein the first sub-pixel unit comprises a first thin film transistor and a first pixel electrode, and a first drain electrode of the first thin film transistor is connected to the first pixel electrode; and
   a second sub-pixel unit, wherein the second sub-pixel unit comprises a second thin film transistor and a second pixel electrode, a second drain electrode of the second thin film transistor is connected to the second pixel electrode, a first source electrode of the first thin film transistor and a second source electrode of the second thin film transistor are connected to the same one of the data lines;
   wherein the pixel structure further comprises an extension electrode connected to the first drain electrode or the second drain electrode and located between the first pixel electrode and the second pixel electrode;
   wherein the first sub-pixel unit is disposed near a corresponding one of the data lines, the second sub-pixel unit is disposed away from a corresponding one of the data lines; and
   wherein the extension electrode comprises a first longitudinal electrode section and a second longitudinal electrode section disposed in a longitudinal gap formed between the first sub-pixel unit and the second sub-pixel unit, the first longitudinal electrode section corresponds to the first sub-pixel unit, the second longitudinal electrode section corresponds to the second sub-pixel unit, and the first longitudinal electrode section and the second longitudinal electrode section are disposed separately.

12. The display panel according to claim 11, wherein along an extension direction of the data lines, a length size of the first longitudinal electrode section is less than a length size of the second longitudinal electrode section.

13. The display panel according to claim 11, wherein along an extension direction of the scan lines, a width size of the first longitudinal electrode section is less than a width size of the second longitudinal electrode section.

14. The display panel according to claim 11, wherein the extension electrode further comprises first transverse electrode section and second transverse electrode section, the first transverse electrode section and the second transverse electrode section extends along a direction of the scan lines, the first transverse electrode section and the second transverse electrode section are disposed on two sides of the second sub-pixel unit; and the first longitudinal electrode section is electrically connected to the first transverse electrode section, and the second longitudinal electrode section is electrically connected to the second transverse electrode section.

15. The display panel according to claim 14, wherein a sum of lengths of the first longitudinal electrode section and the first transverse electrode section is less than a sum of lengths of the second longitudinal electrode section and the second transverse electrode section.

16. The display panel according to claim 14, wherein the extension electrode further comprises a first transparent electrode and a second transparent electrode, the first longitudinal electrode section is electrically connected to the first transparent electrode, and the second longitudinal electrode section is electrically connected to the second transparent electrode.

17. The display panel according to claim 16, wherein along a top view direction of the pixel structure, the first transparent electrode is located in the first sub-pixel unit, the second transparent electrode is located in the second sub-pixel unit.

18. The display panel according to claim 17, wherein the first longitudinal electrode section, the second longitudinal electrode section, the first transparent electrode, the second transparent electrode, the first transverse electrode section, and the second transverse electrode section are disposed in the same layer.

* * * * *